US009042298B2

United States Patent
Bruce

(10) Patent No.: US 9,042,298 B2
(45) Date of Patent: May 26, 2015

(54) METHOD AND APPARATUS FOR ENABLING INTERNET-BASED EMERGENCY CALLS

(75) Inventor: Robert L. Bruce, Glenn Dale, MD (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 85 days.

(21) Appl. No.: 13/158,135

(22) Filed: Jun. 10, 2011

(65) Prior Publication Data
US 2012/0314625 A1    Dec. 13, 2012

(51) Int. Cl.
*H04W 4/00*      (2009.01)
*H04L 12/58*     (2006.01)

(52) U.S. Cl.
CPC ...................... *H04L 51/20* (2013.01)

(58) Field of Classification Search
CPC ............... H04L 51/20; H04L 12/1845; H04L 29/08648; H04L 67/1021; H04W 4/02; H04W 4/046
USPC .................... 370/310–350; 455/404.2, 414.2, 455/456.1–457, 404.1, 521
See application file for complete search history.

(56) References Cited

U.S. PATENT DOCUMENTS

| 7,260,415 | B1 * | 8/2007 | Oh .................................. 455/522 |
| 7,535,880 | B1 * | 5/2009 | Hinman et al. ................ 370/338 |
| 2004/0044554 | A1 * | 3/2004 | Bull et al. ........................ 705/8 |
| 2006/0211431 | A1 * | 9/2006 | Mansour et al. ............ 455/456.2 |
| 2007/0153986 | A1 * | 7/2007 | Bloebaum et al. .............. 379/45 |
| 2007/0202888 | A1 * | 8/2007 | Brachet et al. ............. 455/456.1 |
| 2007/0238448 | A1 * | 10/2007 | Gallagher et al. .......... 455/414.2 |
| 2010/0260145 | A1 * | 10/2010 | Voyer et al. ................... 370/331 |
| 2012/0280866 | A1 * | 11/2012 | Alizadeh-Shabdiz ........ 342/463 |

* cited by examiner

*Primary Examiner* — Andrew Chriss
*Assistant Examiner* — Kenan Cehic

(57) ABSTRACT

An approach is provided for certifying wireless access nodes for use in connection with emergency calls. A certification platform certifies location information of a wireless access node as part of an emergency response service for packetized voice calls. The location information is then stored in a database that includes a plurality of certified location information of a respective plurality of wireless access nodes including the activated wireless access node. The database is accessed in response to an emergency call to assist with determination of position information of wireless devices based on location information of the wireless access node that detects presence of the wireless device.

14 Claims, 15 Drawing Sheets

306

300

400

500

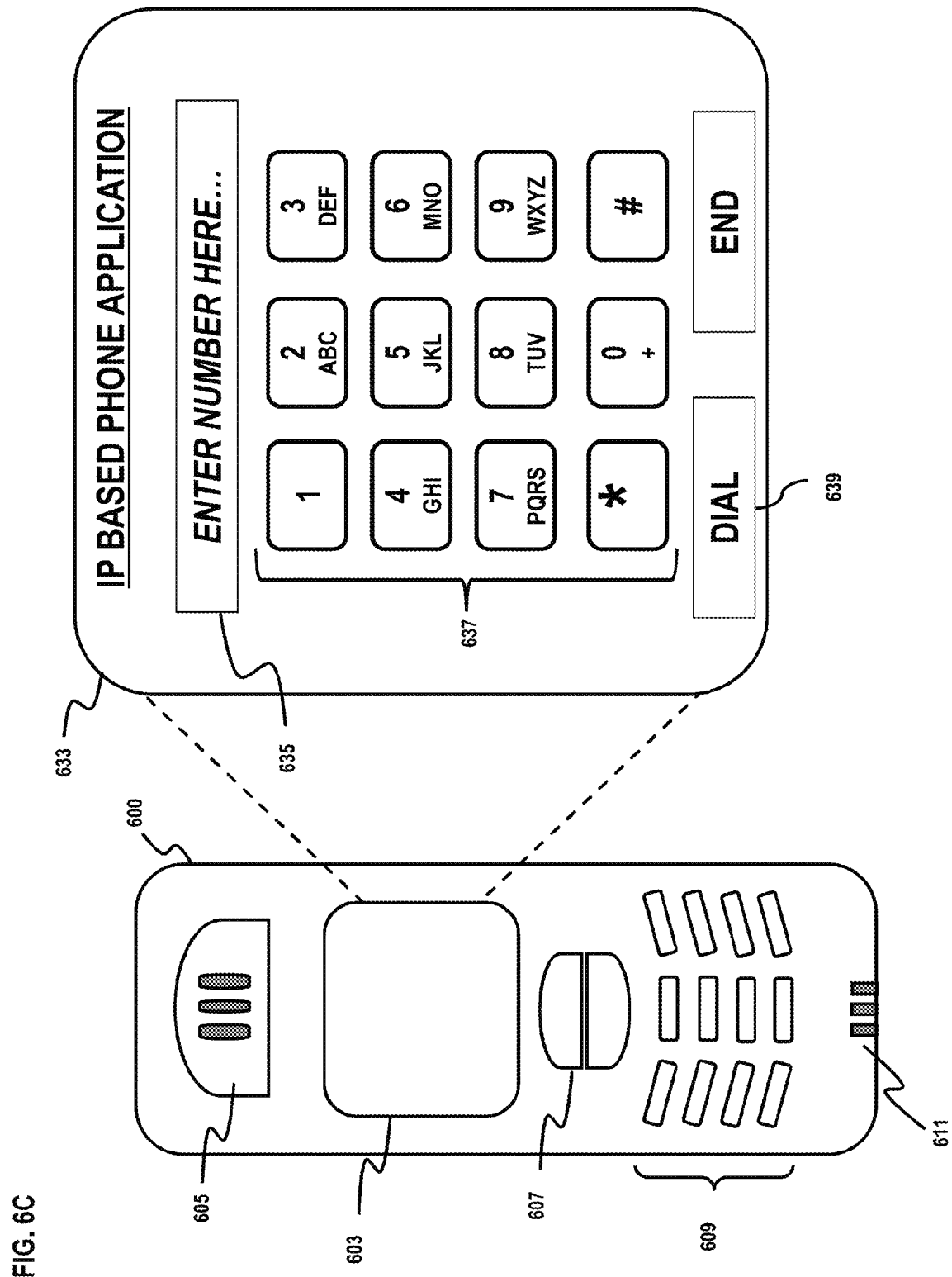

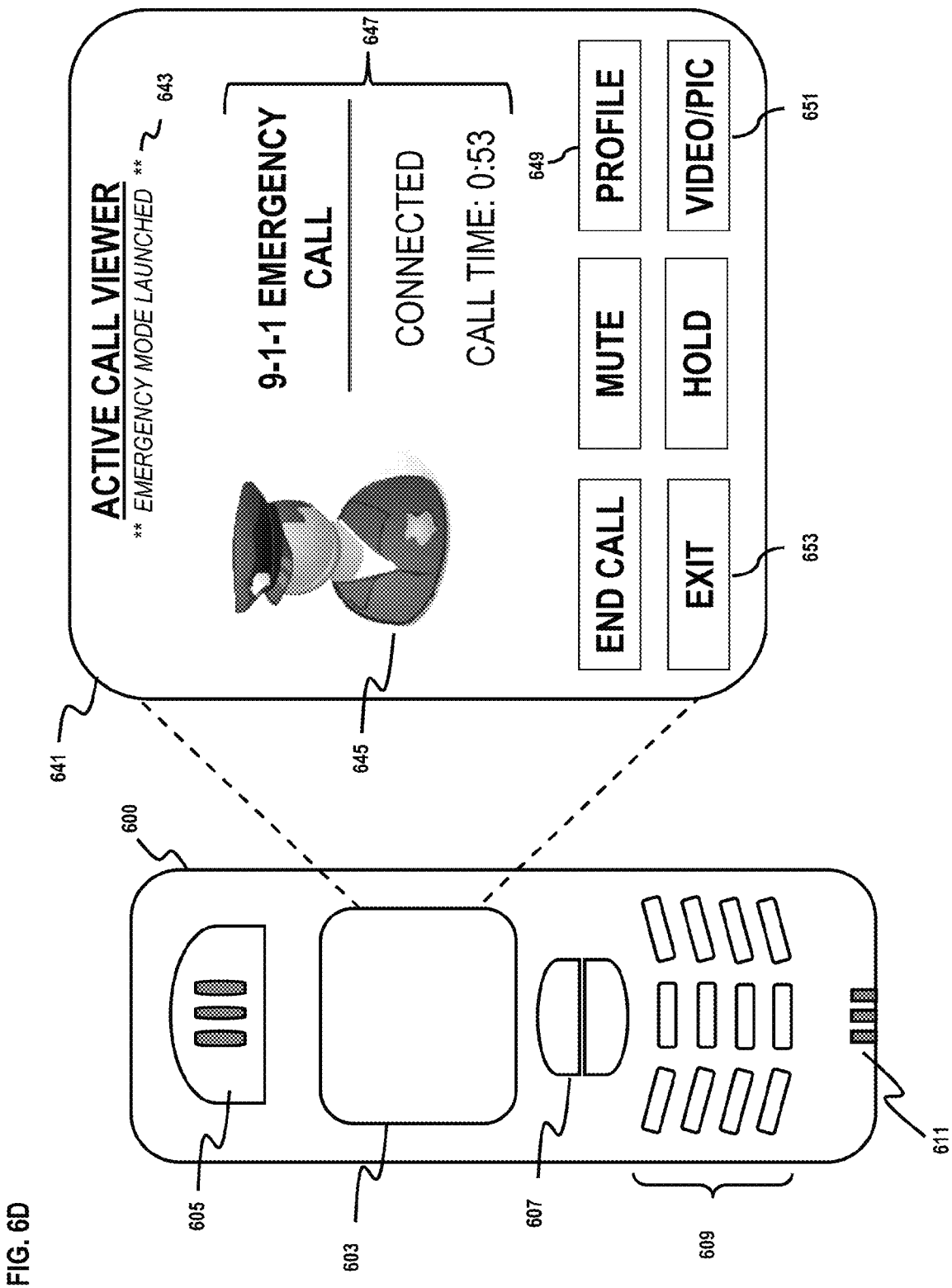

FIG. 7
700

DISPATCH VIEWER                                                     WELCOME DISPATCHER A | *LOGOUT*

EMERGENCY CALL (RECEIVED 6/12/XX @ 2:20PM)

FROM:        DOE, ZIGGY
PHONE #:     (888) 888-8888
WAP LOCATION: 1234 FAST LANE
LAVILLE, ANYWHERE 60XXX
WAP ID: 987654
IP ADDRESS: XXX.XXX
TOWER ID: 012345         — 701 zig@email.com
Emergency Contact: — 703
Jolie, Angelica
(888) 888-8888

POSITION INFO:
APPROX: INTERSECTION OF FAST
LANE/QUICK RD         — 705

— 715

*ENTER CALL NOTES HERE*

[ EXIT ] — 709    [ RECORD ] — 707    [ DISPATCH ] — 713    [ SEND INSTRUCTIONS ]

— 711

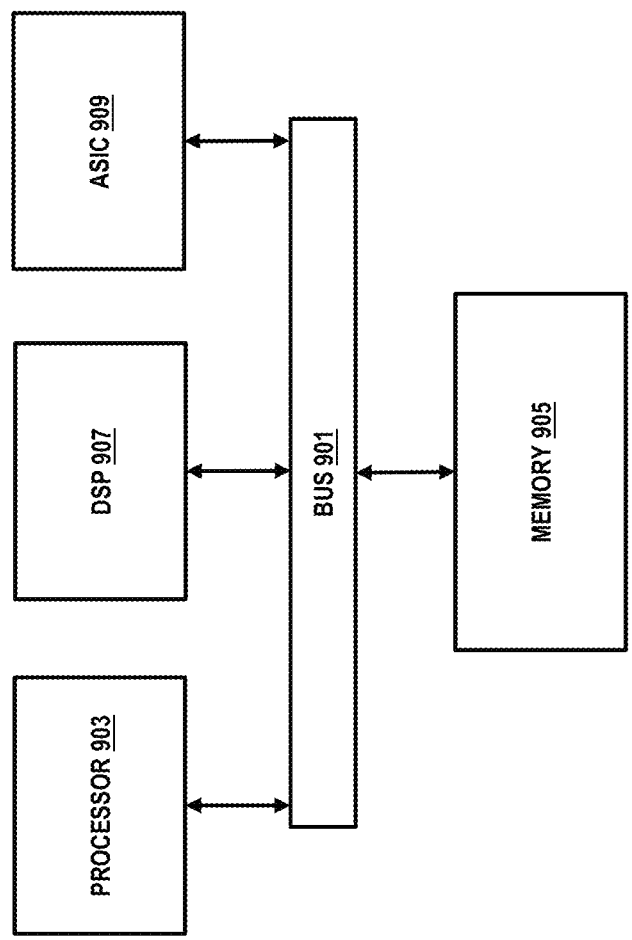

METHOD AND APPARATUS FOR ENABLING INTERNET-BASED EMERGENCY CALLS

BACKGROUND INFORMATION

Modern telecommunications services, particularly wireless mobile communication devices, can be utilized to enhance public safety. During emergencies, these devices are indispensible for contacting the appropriate people or authorities. Traditionally, when a user places a call for help, the call signal is routed to the nearest emergency facility with respect to the user's current geographic location. In this manner, the "closest" emergency responder can be dispatched rapidly to that geographic locale. Automatic number identification (ANI) and/or automatic location identification (ALI) technology can be employed to readily identify the phone number and ultimately the physical location of the caller. Telephony technologies, such as voice over internet protocol (VoIP), have permitted users to place calls anywhere around the world cost-effectively. Thus, the popularity of this technology continues to grow, particularly as broadband and cellular services are developed to improve the quality of VoIP calls. Unfortunately, traditional telephony infrastructure have limited to no capability to correlate physical locations of Internet-based calls.

Therefore, there is a need for an approach that effectively and efficiently enables the determination of the physical locations of communication devices for processing of packetized voice calls.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 6A-6D are diagrams of user interfaces for facilitating the placement of an emergency call based on certified location information, according to various embodiments;

FIG. 7 is a diagram of a dispatcher interface for presenting information for discovering the location of a wireless device based on the placement of internet-based emergency call, according to one embodiment;

FIG. 9 is a diagram of a chip set that can be used to implement various exemplary embodiments.

DESCRIPTION OF THE PREFERRED EMBODIMENT

A preferred method and apparatus for discovering the location of wireless devices in response to the placement of internet-based emergency calls are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a mobile or wireless device, it is contemplated that these embodiments have applicability to any device capable of communicating over a network using voice and non-voice technologies.

Figure 1A:
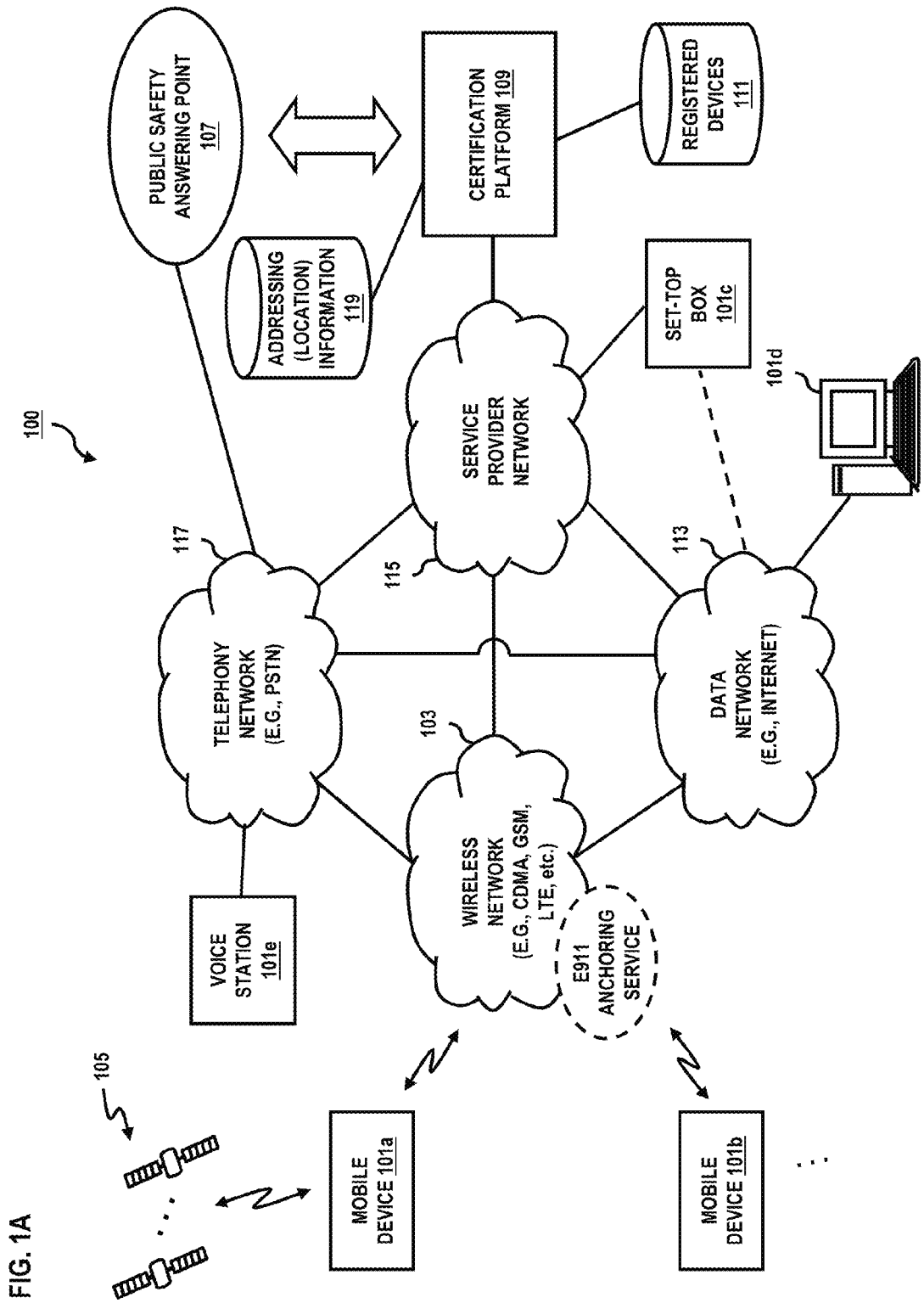
FIGS. 1A and 1B are, respectively, a diagram of a system for discovering the location of wireless devices in response to the placement of internet-based emergency calls, and a collection of wireless access nodes utilized in the system of FIG. 1A, according to various embodiments.

FIG. 1A is a diagram of a system for discovering the location of wireless devices in response to the placement of internet-based emergency calls, according to an exemplary embodiment. The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as voice over internet protocol (VoIP), is the conversion of voice information into data packets that are transmitted over an IP network. Such technology has reduced telecommunication costs and enhanced users' convenience in seamlessly employing computing and communication applications and services. As used herein, "internet-based calls" may include any calls placed as packetized voice data over an internet protocol or other equivalent protocols. Packetized voice calls (e.g., Internet-based telephony calls) may be facilitated using voice over internet protocol (VoIP), IP telephony, Internet telephony, voice over broadband (VoBB), broadband telephony, broadband phone and any other related protocols, technologies and applications. It is noted that the system of FIG. 1A enables emergency calls, such as those placed to emergency responders, to be reliably identified and tracked to the source of the call to permit identification of physical locations even when the call is placed over the internet or other data networks.

Emergency calls, or "911" calls, are one example of a type of call that relies on the identification and location of the calling party to be determined to provide an immediate emergency response by emergency personnel or responders, such as police officers, firefighters and paramedics, etc. When a user seeks emergency assistance, the user can dial 911 using a land line or cellular phone, and the call is routed to the local switch or tower configured to handle calls for that area. With non-internet-based calls, the call is then directed to a local public safety access point (PSAP)—i.e., 911 call center—that is mapped to that specific location, such as by way of a registry or directory service. If the public safety access point (PSAP) receiving the emergency call is equipped with an automatic number identification (ANI) and/or automatic location identification (ALI) system, the operator/dispatcher is able to immediately recognize the caller's phone number and/or address and quickly dispatch emergency responders.

An anchoring service may be used to facilitate these capabilities. Hence, non-internet-based emergency calls are automatically associated with and directed to the appropriate PSAP.

However, if the emergency call is a packetized voice call (e.g., established using VoIP service or other internet-based phone dialing application), the call, traditionally, cannot be properly directed to any PSAP. This inability to determine a local PSAP is attributable to the manner in which packetized voice calls are established; namely, the location of the user device need not be known. By way of example, a caller could be hundreds or even thousands of miles away from the caller's primary residence, but the calling facilities has no knowledge of the caller's physical location (as the call is associated with an IP address); yet if the internet-based call is directed to a PSAP that is triggered based on the user's resident address, the emergency response would be futile as the caller is not currently at the caller's place of residence. Consequently, it is not possible to reliably and accurately identify the location of a VoIP capable wireless device (e.g., cellular phone, laptop computer, tablet computer) as there is no point of reference to associate the wireless device with the most relevant PSAP. Even if a GPS receiver is installed in the VoIP adapter, the ability to accurately locate the device is still limited given that many GPS enabled devices are normally used indoors where signal strength may be compromised. These factors significantly limit the use of VoIP, peer-to-peer and other internet-based telephony applications as a viable, all encompassing alternative to switch or cellular tower based phone solutions.

To address this problem, the approach of system 100, according to certain embodiments, enables wireless access nodes to be certified by a communication service provider as capable of facilitating emergency response calls placed over a network (e.g., the Internet). As used herein, a "wireless access node" includes any device for enabling a wireless/mobile device 101a-101b to access a communication network, including routers, data proxies, etc. By way of example, the certification may include a verification and/or authentication of location information pertaining to a wireless access node that is registered with the communication service provider. The certified location information, which may include a physical or postal address corresponding to the location of the node, is maintained in a database 119 by a certification platform 109 of the provider. In addition to maintaining certified location information 119, the certification platform 109 is also configured to facilitate the emergency call provisioning process based on the stored location information. Under this approach, a user of a mobile device 101a or 101b is able to access a certified wireless access node in order to convey vital position information for enabling an emergency responder to detect or determine the position of the device 101a-101b. As used herein, the position information includes data for identifying the whereabouts of a wireless device based on its interaction with one or more wireless access nodes.

In one embodiment, the communication service provider maintains the certified location database 119 as a directory service for use in connection with emergency response systems.

Figure 1B:
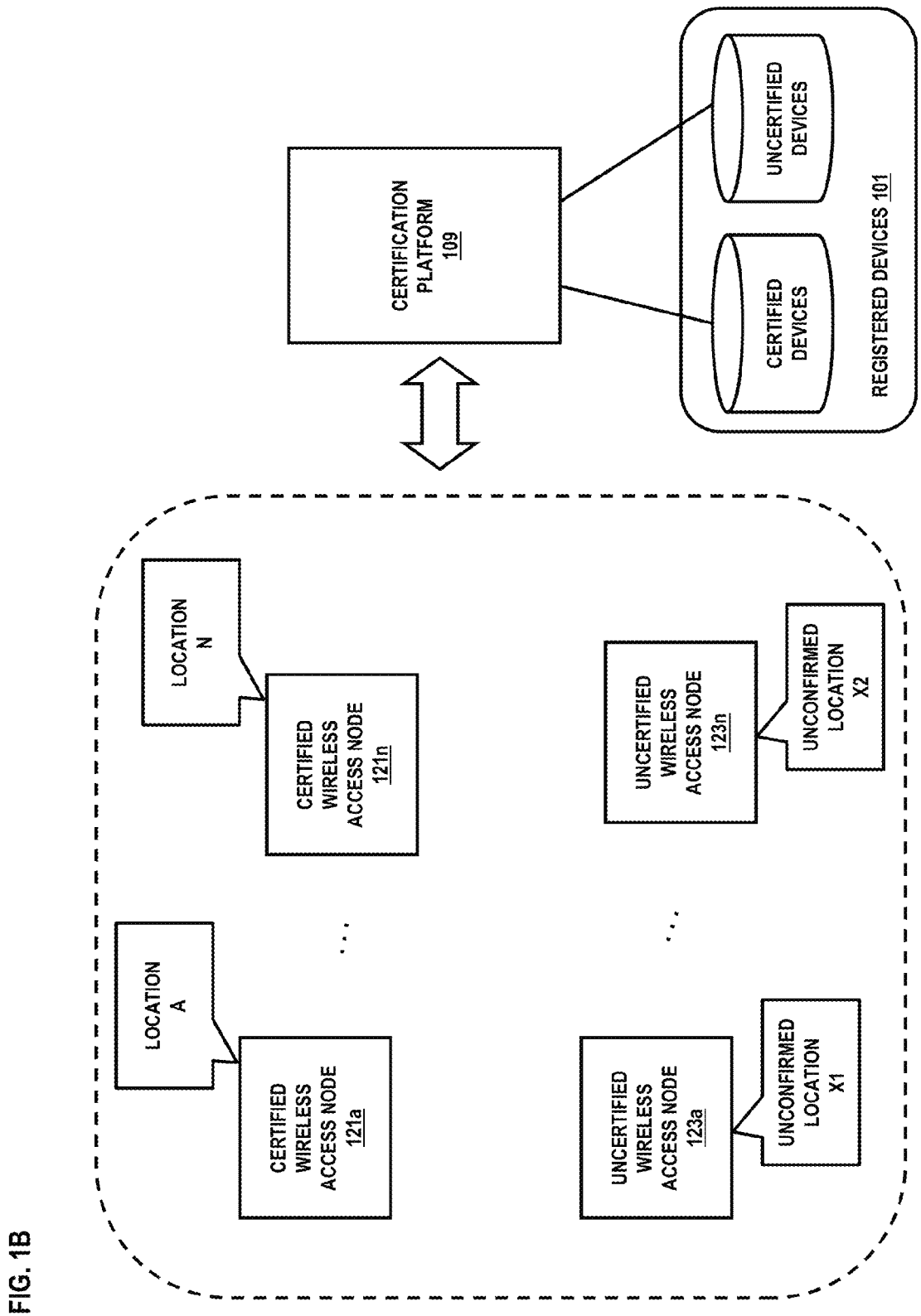

With respect to FIG. 1B, a multitude of wireless access nodes 121 and 123 can exist within service provider network 115 and/or data network 113. These nodes 121 and 123 can alternatively be referred to as wireless access points (WAPs). In certain embodiments, the nodes 121 and 123 can include a router, a hub, or any network element capable of providing connectivity to a wireless network. By way of example, whenever a wireless access node 123a is installed, the service provider facilitates a certification process of that node 123a via the certification platform 109; in particular, to certify the address of the premise (e.g., office building (and associated floor and room), residence, etc.) to which the node is configured. Further, in certain embodiments, a recertification process may be implemented to ensure the location information of the relevant certified access nodes is not stale; this time period for recertification is configurable and based on various parameters, e.g., demographic data. An apartment area in which transient professionals live (e.g., an engineer who resides at a location for worked related temporary projects) may require a shorter recertification time period than a community of single family homes.

While not shown expressly, service provider network 115 may be configured through the interconnection and interaction of one or more wireless access nodes 121a-121n. The registry or directory service may then be accessed by the PSAP 107 for facilitating retrieval of location information associated with a wireless device that accesses one or more of these nodes for the purpose of facilitating an emergency call. In this example, wireless access nodes 121a-121n are deemed certified by the service provider; such certification can be performed based on a physical inspection and verification of the devices by a technician, and/or performed by remote testing and verification of signaling with the access nodes 121a-121n. Upon certification, platform 109 can note certified wireless access node 121a is associated with Location A, and certified wireless access node 121n is associated with Location N; these information can be utilized directed to determine location information of a wireless device that is detected by the corresponding node 121a, 121n. For instance, the approximate whereabouts of the wireless device can be used based on the coverage area of the certified access node 121a, assuming the device (e.g., device 101a) is detectable by the certified access node 121a. In the case that Location A corresponds to a detached home, such location information (e.g., postal address) would be permit emergency responders to more readily find the user in need of assistance. However, if node 121a serves a user in a multi-unit dwelling (e.g., apartment building), then Location A may include the postal address and apartment number, for instance.

As shown, uncertified wireless access nodes 123a-123n can also be maintained by certification platform 109 within registered devices database 111. Location information of these uncertified access nodes 123a-123n can be deemed unconfirmed, but nevertheless may be of some use in determining position of a user device (e.g., device 101a). Under one scenario, assuming certified wireless access node 121a and the uncertified wireless access node 123a can both be detected by device 101a because of their proximity to the device 101a; such information can give rise to a greater level of confidence that unconfirmed Location X1 has the same postal address as that of certified node 121a (assuming certified node 121a exists within a multi-unit dwelling, for example). In this regard, such information can be a factor in certifying node 123a. Moreover, if certified wireless access node 121a underwent a certification process outside of a recertification time period, for instance, then if the unconfirmed Location X1 is the same postal address as Location A, this may suffice to recertify access node 121a. It is contemplated that certification platform 109 can provide location information with differing levels of confidence for the purpose of obtaining emergency services to a user (e.g., subscriber). The degrees of confidence can be based on the mixture of use of certified access nodes and uncertified access nodes, and or based on whether certain unconfirmed location information is more reliable than others.

The following scenarios exist with the placement of a VoIP call: (1) phone-to-phone, (2) phone-to-PC, (3) PC-to-phone, and (4) PC-to-PC. In the first scenario of phone-to-phone call establishment, voice station 101e is switched through PSTN 117 by a switch to a VoIP gateway (not shown), which forwards the call through the IP network 113. The packetized voice call is then routed through the IP network 113, exiting the IP network 113 at an appropriate point to enter the PSTN 117 and terminates at another voice station (not shown). Under the second scenario, a voice station places a call to PC through a switch to the PSTN 117. This voice call is then switched by the PSTN 117 to a VoIP gateway (not shown), which forwards the voice call to a PC 101d via the IP network 113. The third scenario involves PC 101d placing a call to voice station 101e. Using a voice encoder, the PC 101d introduces a stream of voice packets into the IP network 113 that are destined for a VoIP gateway (not shown). The VoIP gateway (with the SIP provider cloud) converts the packetized voice information into a POTS (Plain Old Telephone Service) electrical signal, which is circuit switched to the voice station. Lastly, in the fourth scenario, PC 101d establishes a voice call with another PC (not shown); in this case, packetized voice data is transmitted from the PC 101 via the IP network 113 (and or service provider network 115) to another PC, where the packetized voice data is decoded. The above telephony scenarios may utilize the Session Initiation Protocol (SIP) (or equivalent protocol) to establish the voice sessions. A detailed discussion of SIP and its call control services are described in Internet Engineering Task Force (IETF) Request for Comment (RFC) 2543 and IETF Internet draft "SIP Call Control Services", Jun. 17, 1999; both of these documents are incorporated herein by reference in their entireties. SIP messages are either requests or responses.

While various embodiments are described herein in relation to emergency calls as placed over a network, the principles may also be applicable to any type of voice call that utilizes location and identification information about the calling party when providing a service. In system 100 of FIG. 1A, wireless devices, such as mobile devices 101a, 101b (e.g., cellular phones, BLUETOOTH-enabled devices, WiFi-enable devices, etc.), a set-top box (STB) 101c, a computer 101d (e.g., desktop computer, laptop, web appliance, etc.), and voice station 101e are configured to communicate over a wireless network 103 using voice sessions as well as other non-voice sessions by way of an wireless access node. Communication sessions performed by these devices include short messaging service (SMS), enhanced messaging service (EMS), multimedia messaging service (MMS), instant messaging (IM) and other media exchange. Mobile devices 101a, 101b may be any cellular phone, radiophone, satellite phone, smart phone, wireless phone, or any other suitable mobile device, such as a personal digital assistant (PDA), pocket personal computer, tablet, customized hardware, etc.

Enhanced 911 (E911) service is a feature of the emergency call system that automatically associates a physical address with a calling party's Automatic Number Identification (ANI). In other words, the E911 service provides emergency responders with the location of the emergency without the calling party having to provide such information. In the case of emergency response calls placed via a network such as the Internet, certified location information maintained by the certification platform 109 can be cross referenced for associating the call with the appropriate public safety access point (PSAP)—i.e., the final location of the 911 operator/dispatcher handling the call based on the location of the originating call/caller. Hence, the ANI information for a 911 caller is used to look up the address of the calling party in the location information database 119, thus furthering the capability of Automatic Location Identification (ALI) data as maintained for land lines and cellular lines. For mobile devices 101a and 101b, identifying the nearest PSAP for the caller can be enhanced by including geographical or spatial information (for determining local information) in the telephone call set-up as well. As shown in the example of FIG. 1A, a constellation of global positioning system (GPS) satellites 105 can communicate with the mobile devices 101a, 101b to provide such location information.

By way of example, one or more mobile devices 101a, 101b may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. SPS technology utilizes a constellation of satellites that transmit signals to receivers (not shown) of, for example, one or more mobile devices 101a, 101b, so that the receivers may determine corresponding spatial positions (or locations), speeds, directions, and/or timing for mobile devices 101a, 101b.

Public safety access point (PSAP) 107 operates in conjunction with a certification platform 109 to provide a position determination capability. A database 119 is maintained by the certification platform 109 to store information about which wireless access nodes are participating in the certification process and thus, configured to facilitate emergency calls through a wireless access node. These registered wireless access nodes can interact with any mobile device 101a, including those belonging to or not belonging to the user/owner of the node. By way of example, a Wi-Fi router configured at a local café may interact with a mobile device 101 of a visiting customer by way of a handshaking, recognition or network detection process. Such interaction may include, for example, detection by the mobile device of the presence of the router and a subsequent acknowledgement by the router of its availability by the mobile device 101 for access. The device 101 may access a network, such as service provider network 115, by way of the router given the appropriate access and security settings are provided. Regardless of whether the network is accessed, however, interaction between the router and the device 101 occurs through the initial handshaking process. In certain embodiments, the location information 119 maintained by the certification platform 109 may be used in connection with various location or presence detection techniques, including GPS or handshaking techniques such as Wi-Fi positioning systems approaches, to determine position information for a wireless device.

In system 100, according to certain embodiments, one or more networks, such as data network 113, service provider network 115, telephony network 117, and/or wireless network 103, are provided to handle various communication sessions, voice communications as well as non-voice communications. Networks 103 and 113-117 may be any suitable wireline and/or wireless network. For example, telephony network 117 may include a circuit-switched network, such as the public switched telephone network (PSTN), an integrated services digital network (ISDN), a private branch exchange (PBX), or other like network. In one embodiment, the certification platform 109 interacts with the PSAP 107 via the service provider network 115. For the purpose of illustration, it is assumed the service provider operates the telephony network 117 as well as any of the other networks 103 and 113 (as well as others not shown) in which case the certified location information database 119 would store location information about wireless access nodes configured to those networks as well.

In certain embodiments, the certification platform 109 may assist with establishing a communication session between a registered/certified wireless access node and the PSAP 107 to enable the gathering of information about the person in the emergency situation. The PSAP 107, thus, may more effectively attend to emergency calls received via the node. While specific reference will be made hereto, it is contemplated that system 100 may embody many forms and include multiple and/or alternative components and facilities. In one embodiment, the platform 109 can be deployed as part of the PSAP 107.

Wireless network 103 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Additionally, the networks 113 and 115 may encompass terrestrial broadcasting networks, provider specific networks (e.g., a Verizon® FiOS® network, etc.), and the like. Further, the service provider can be an internet protocol television (IPTV) service provider, which offers subscribers various video services ranging from multi-channel video programming that mimics traditional broadcast television, to true video-on-demand (VOD) programming. In one embodiment, service provider network 115 integrates the television medium with that of the telecommunications, computing, and media environments, thereby broadening the scope of devices and sources available to individuals for obtaining media content. In this manner, users, via user equipment (e.g., STB 101*c*) can receive media content accessible over the data network 113. Although the user equipment is described with respect to an STB, it is contemplated that various embodiments have applicability to any device capable of processing audio and/or video streams. Media content broadly includes any audio-visual content (e.g., broadcast television programs, VOD programs, pay-per-view programs, IPTV feeds, digital video disc (DVD) related content, etc.), pre-recorded media content, data communication services content (e.g., commercials, advertisements, videos, movies, songs, images, sounds, etc.), Internet services content (streamed audio, video, or pictographic media), and/or any other equivalent media form.

Although depicted as separate entities, networks 103 and 113-117 may be completely or partially contained within one another, or may embody one or more of the aforementioned infrastructures. For instance, service provider network 115 may embody circuit-switched and/or packet-switched networks that include facilities to provide for transport of circuit-switched and/or packet-based communications. It is further contemplated that networks 103 and 113-117 may include components and facilities to provide for signaling and/or bearer communications between the various components or facilities of system 100. In this manner, networks 103 and 113-117 may embody or include portions of a signaling system 7 (SS7) network, or other suitable infrastructure to support control and signaling functions. As such, the conjunction of networks 103 and 113-117 may be adapted to facilitate the node certification and location detection services of system 100.

Figure 2A:
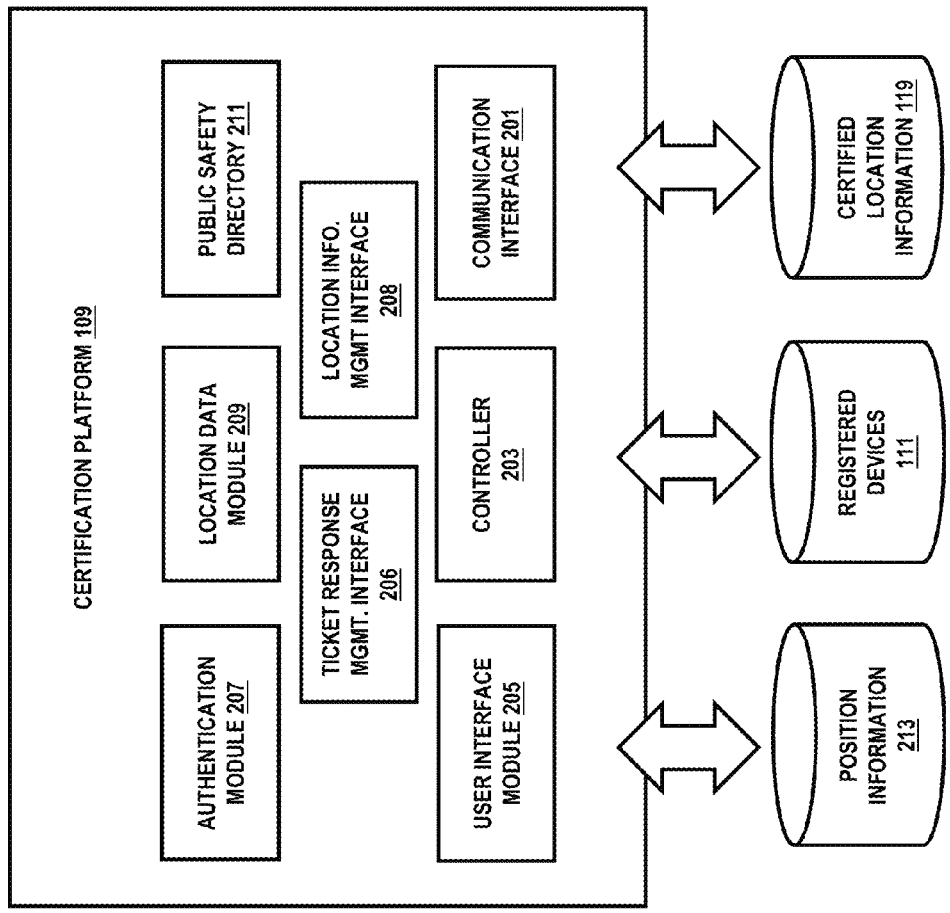
FIGS. 2A and 2B are, respectively, a diagram of a certification platform and a wireless device configured to support the discovery of location information pertaining to wireless access nodes in response to the placement of internet-based emergency call, according to various embodiments.
Figure 2B:
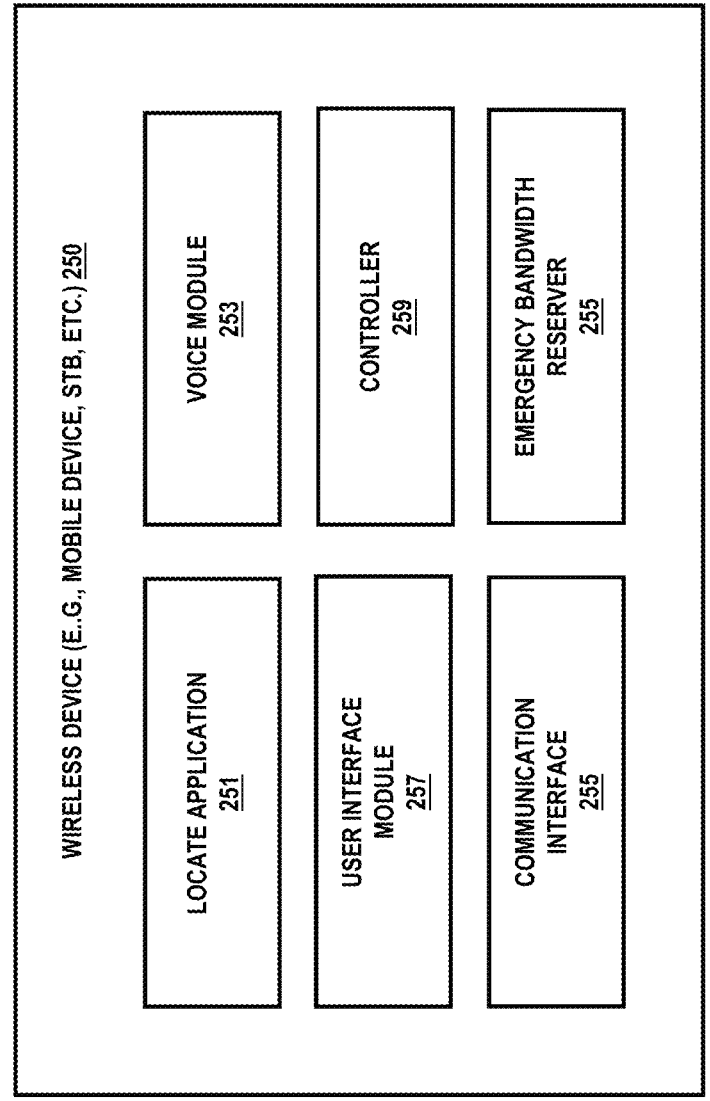

FIGS. 2A and 2B are, respectively, a diagram of a certification platform and a wireless device configured to support the discovery of location information pertaining to wireless access nodes in response to the placement of internet-based emergency call, according to various embodiments. As seen in FIG. 2A, certification platform 109 may comprise computing hardware (such as described with respect to FIG. 8 and FIG. 9), as well as include one or more components configured to execute the processes described herein for providing the certification services of system 100. In one implementation, platform 109 includes communication interface 201, controller (or processor) 203, user interface module 205, authentication module 207, location data module 209 and public safety directory 211. Platform 109 may also communicate with one or more repositories, such as position information database 213, as well as registered devices database 111 and certified location information database 119. While specific reference will be made to this particular implementation, it is also contemplated that platform 109 may embody many forms and include multiple and/or alternative components. For example, it is contemplated that the components of platform 109 may be combined, located in separate structures, or separate locations.

According to one embodiment, platform 109 embodies one or more application servers over one or more networks 103 and 113-117. User interface module 205 may be configured via a web browser, web portal or other network-based application or system, such as a voice browser or interactive voice recognition system. By way of example, the user interface module 205 permits users of wireless access nodes (e.g., routers) to directly register the nodes for certification.

In other instances, the user interface module 205 may be configured to support a ticket response management interface 206 and a location information management interface 208. The ticket response management interface 206 enables an agent of the service provider to respond to a certification request associated with one or more wireless access nodes. For example, information presented via the interface may include a ticket number, item number or job number, the proposed postal address of the premise to which the node is located, customer or company profile information, node identifier data, network configuration data, etc. In addition, the ticket response management interface 206 enables the agent to indicate/verify completion of inspection of the node by entering in a code generated upon scanning of a barcode or other identifier affixed to a label on the WAP, selecting a "YES" checkbox, or other verification means.

The location information management interface 208 may be accessed by the service provider for reviewing compiled location information pertaining to one or more certified wireless access nodes (e.g., nodes 121*a*-121*n*). By way of example, the location information may be made available for viewing as a list/directory by an agent of the service provider or a PSAP operator. It can also be parsed, processed and/or analyzed by the PSAP 107 using data mining, indexing or directory access techniques in response to the placement of an internet-based emergency call.

By way of example, the certified location information as stored to the database 119 or as presented for viewing may include a wireless access node identifier values, locations of the node, a client identifier value for referencing the owner of the node, a coverage area expressed as a zone or area range value, a certification status of the node (e.g., certified, uncertified, unknown), a date of certification, an identifier and name of the agent that facilitated the certification, a ticket number or job number corresponding to the certification, a date of subsequent inspection, emergency responder information pertaining to the wireless access node, and other like information. The various data comprising a set of location information for a given wireless access node are more fully described with respect to FIG. 4.

In one embodiment, the authentication module 207 authenticates users, mobile devices 101a-101b and/or wireless access nodes for interaction with the certification platform 103. By way of example, the authentication module 207 receives a request from a user of a mobile device 101 to utilize the certification platform 109 in order to reliably convey vital location information in connection with the placement of internet-based emergency calls. As another example, the module 207 may receive requests for certification of one or more wireless access nodes by the service provider. The subscription process may include establishing user profile information, various access settings or emergency call preferences (e.g., which profile information to convey to an emergency call dispatcher). Preferences and settings information may be referenced to a specific user, mobile device 101, wireless access node or combination thereof, and maintained as profile data in the registered devices database 111.

For initial registrations or updating of mobile devices 101 or wireless access nodes, the authentication module 207 is also configured to generate a ticket to dispatch an agent of the service provider to inspect the activated wireless access node with respect to the location information. The ticket may be forwarded to the agent as an email message, SMS, etc., or presented to the agent via a ticket response management interface (e.g., FIG. 4) as provided via the user interface module 205.

In one embodiment, a communication interface 201 enables the formation of a session between the certification platform 109 and one or more registered wireless devices, i.e., mobile devices 101a, 101b. The session may including facilitating the exchange of data by way of a locate application of the device 101. By way of example, the communication interface 201 executes various protocols and data sharing techniques for enabling collaborative execution between a subscriber's user device 101a-101n (e.g., mobile devices 101a-b, laptops, smartphones, tablet computers, desktop computers 101d, set-top boxes 101c) and the certification platform 109 over the service provider network 115. It is noted that the communication module 201 is also configured to forward determined position information regarding a wireless device as detected by the location data acquisition module 209 to the local public safety access point determined via the public safety directory 211. This includes processing a voice call placed by the wireless device via an internet-based calling application for obtaining an emergency response service; directing of the call to the appropriate PSAP 107 being performed in conjunction with the determined position information for the wireless device.

In certain embodiments, the location data module 209 acquires location data regarding a wireless device, i.e., mobile device 101a or 101b, from which an internet-based emergency call is originated. By way of example, the location data module 209 employs a mathematical, statistical or algorithmic scheme involving a plurality of cellular towers to which the wireless device may interact, including triangulation or trilateration techniques, probabilistic modeling or signal noise filtering. As another example, the location data module 209 may also employ global positioning system (GPS) techniques or local positioning system (LPS) techniques involving one or more wireless access nodes, BLUETOOTH sensors, etc., as a means of determining the location and/or position of the wireless device. Various data points maintained as certified location information 119, coverage area data or signal strength indicators may also be used with respect to the above described techniques for rendering a determination. It is noted that the location data module 209 may also access one or more service provider based or third-party based services for enabling GPS or LPS processing, as well as various tools for mapping the location and/or position of a wireless device.

Once the position information is determined by the location data module 209, it is stored to the position information database 213 for recordation purposes or subsequent retrieval by the wireless device to which it pertains. By recording the position information, subsequent position determinations relative to a given wireless device from which an internet-based emergency call is placed may be calculated based on historical data, frequently visited user locations, etc. Still further, the position information is also analyzed against a public safety directory 211 in order to identify which public safety access point (PSAP) 107 corresponds to the determined position information of the wireless device. For example, when the position information is determined to be located at or within a predetermined threshold of a specific county, city, township, ward, neighborhood, postal address, etc., the public safety directory 211 matches the location to the corresponding PSAP 107 for that county, city, township, ward, neighborhood, postal address, etc., identifies the applicable public safety access point 107.

It is noted, in certain embodiments, that the coverage area data, signal strength indicators and several of the certified location information (e.g., postal address) as mapped using a mapping tool may be used to generate a reliability rating. The reliability rating is a metric for indicating the extent of reliability of a determined certified wireless access node for conveying position information regarding a device to a PSAP. By way of example, a certified wireless access node with a higher determined signal strength relative to the position of the calling wireless device may be assigned a higher reliability rating than a certified node with lower signal strength. As another example, a certified wireless access node determined to be located at the edge of or just outside of its determined coverage area relative to the position of the calling wireless device may be assigned a lower reliability rating than a certified node that is positioned well within its coverage area.

Also, in one embodiment, a controller module 203 is configured to regulate the communication processes between the various other modules. For example, the controller module 203 generates the appropriate signals to control the communication interface 201 for facilitating transmission of data over the network 115 or 117.

On the user side, as shown in FIG. 2B, a wireless device 250, which may be a mobile device (e.g., mobile device 101a and 101b of FIG. 1A), set-top box 101c, or a computer 101d, includes a locate application 251 that is configured to request certified location information 119 from the certification platform 109. The certified location information is retrieved from the database 119 in response to the detection of a wireless access point or in response to the initiation of a packetized voice call via the wireless access point using an emergency directory number. It is noted, therefore, that the locate application is triggered in response to the placement of an emergency call (e.g., 911) via the mobile device 101a, 101b via the access point or in response to the handshaking process that occurs between the device and the wireless access node the provides the access point. Hence, the location information as returned may include a certification status of the wireless access point. The location information may also be accompanied by reliability rating information, signal strength indicators or coverage area information relative to the determined position of the wireless device. In certain embodiments, the locate application is configured to present the location information and other accompanying data to the display of the requesting wireless device.

It is noted that the locate application 251 may be configured to operate and control one or more sensors for detecting and subsequently engaging with one or more wireless access nodes within range of the wireless device. By way of example, the locate application may enable or disable one or more Wi-Fi sensors, GPS sensors, BLUETOOTH sensors, etc. In addition, the locate application may be integrated for use, or function as, a mapping application (e.g., Google Maps) for generating mappings of one or more detected wireless access nodes/points relative to the position of the wireless device, i.e., mobile device 101a, 101b.

Figure 6A:
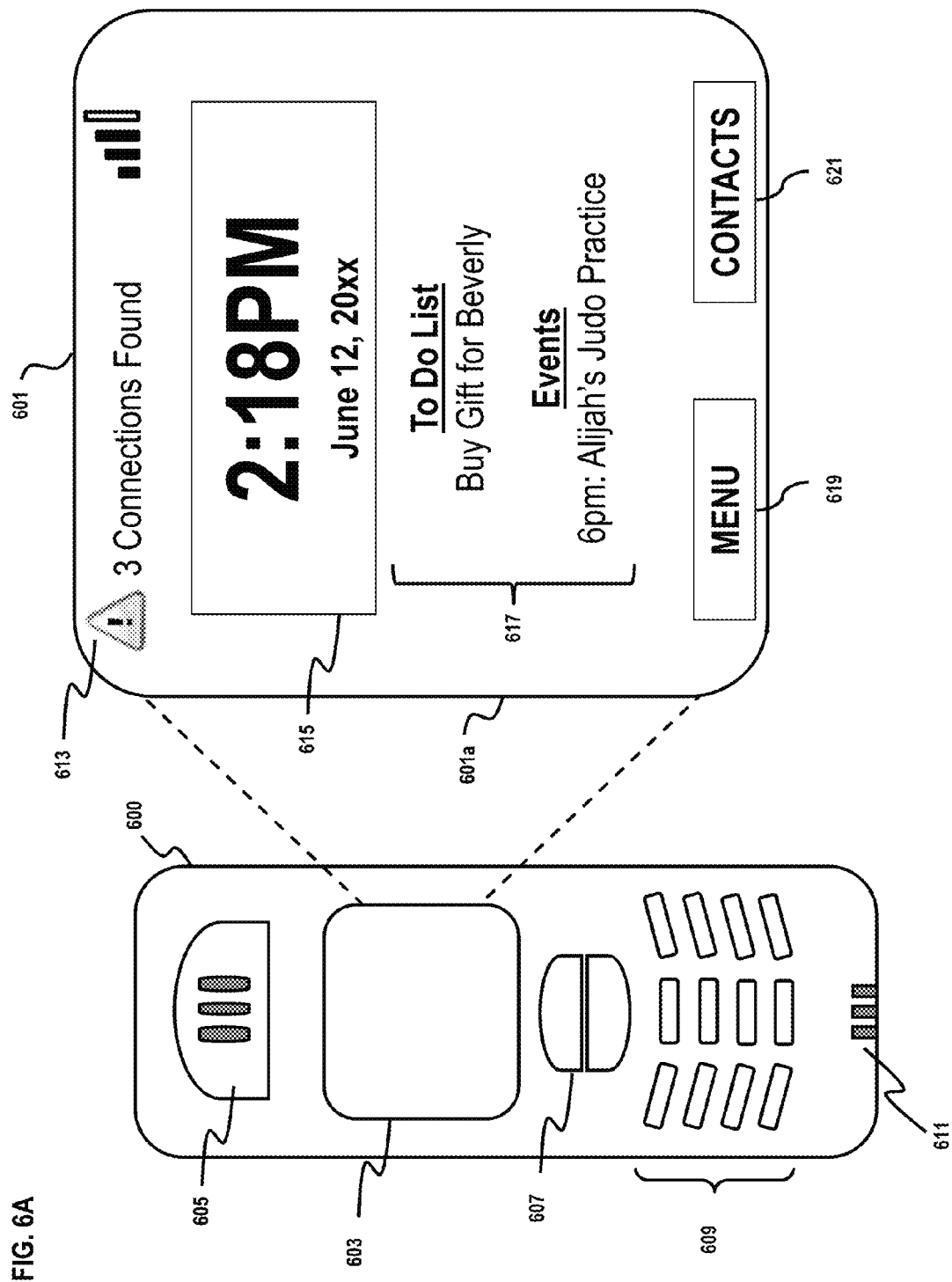
Figure 6B:
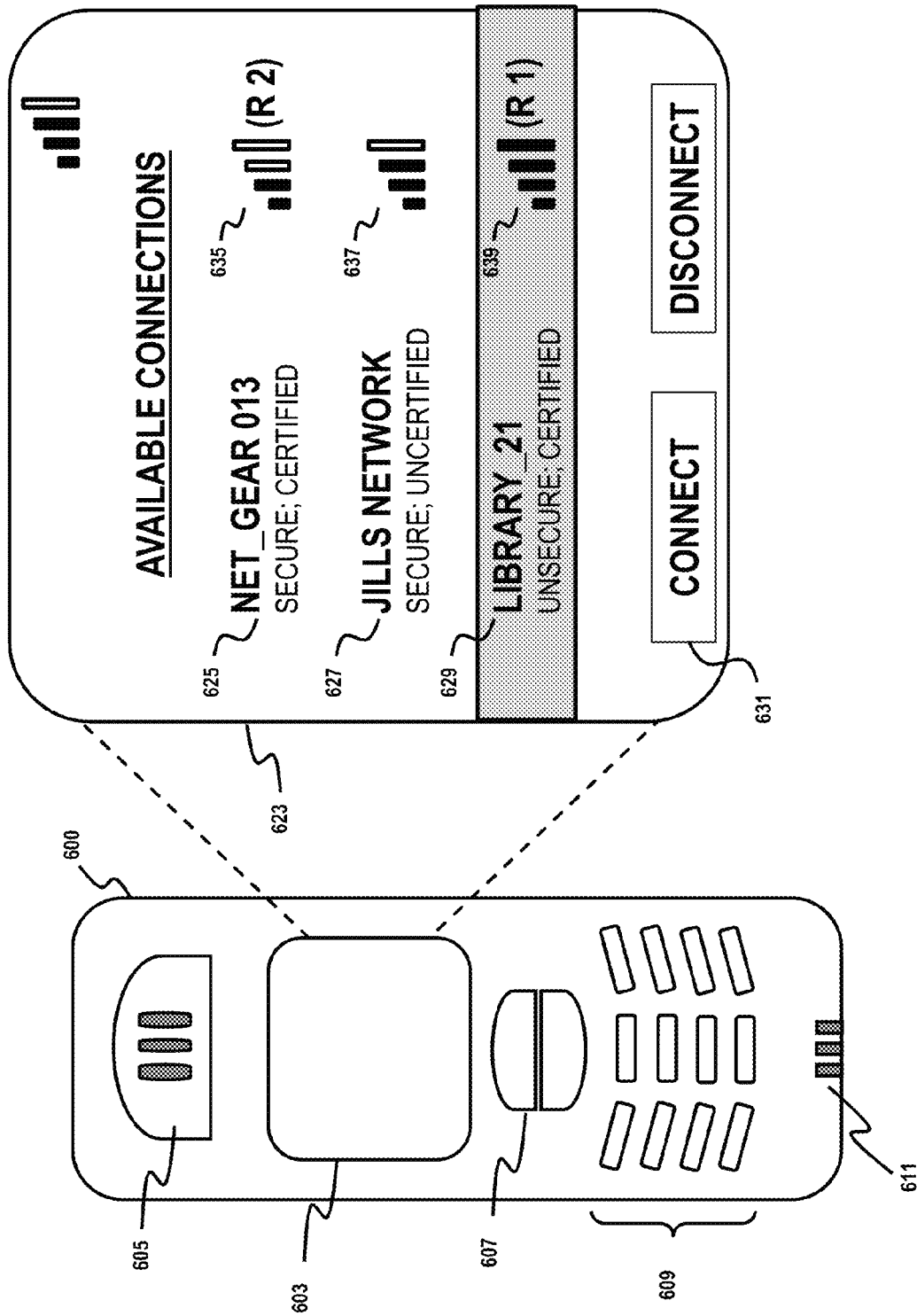

In certain implementations, a voice module 253 is configured to establish a voice-based call. Such voice-based call can be traditional plain-old-telephone service (POTS) calls or packetized voice calls (e.g., VoIP). These communication sessions can occur concurrently during an emergency call. It is noted that these communication sessions can be established over a circuit-switched network, a packet-switch network, or a combination thereof. Thus, communication interface 255 can be appropriately configured depending on the transport systems and networks available for access. Although only a single interface 255 is shown, it is noted that multiple communication interfaces may be utilized, depending on the technologies involved. Moreover, the wireless device 250 employs a user interface module 257 to enable control by the user of the device of these various communication sessions. For example, in one embodiment, the user interface module 257 provides a graphical user interface (GUI) for accessing an internet telephony application, such as shown in FIG. 6C. Alternatively, the telephone application may reside locally at the device 250.

In certain embodiments, an emergency bandwidth reserver 255 establishes and reserves a set amount of bandwidth for use by the device 250 with respect to the wireless access node in the event of placement of an emergency call. By way of example, the emergency bandwidth reserver 255 ensures other bandwidth intensive applications and processes—i.e., video, audio or media applications and processes—do not limit the ability of the user to place an emergency call. A dedicated amount of bandwidth is reserved and emergency calls are determined to be a first priority with regards to access to this bandwidth and/or to a determined certified wireless access node.

Additionally, a controller 259 is configured to coordinate execution of the various other modules of the wireless device 250. For example, the controller 259 generates the appropriate signaling to control the communication interface 255 or for facilitating placement of emergency calls via the voice module 253 by placing the device in an emergency mode.

Figure 3B:
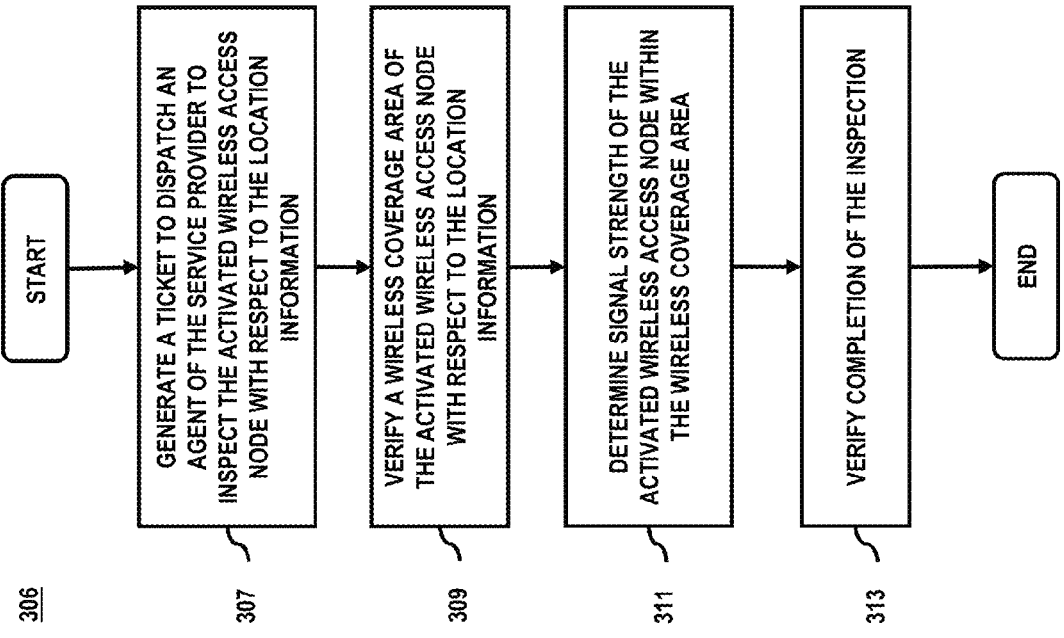
FIGS. 3A-3C are flowcharts processes for certifying a wireless access node to enable the discovering of wireless devices in response to the placement emergency calls via the node, according to various embodiments.
Figure 3A:
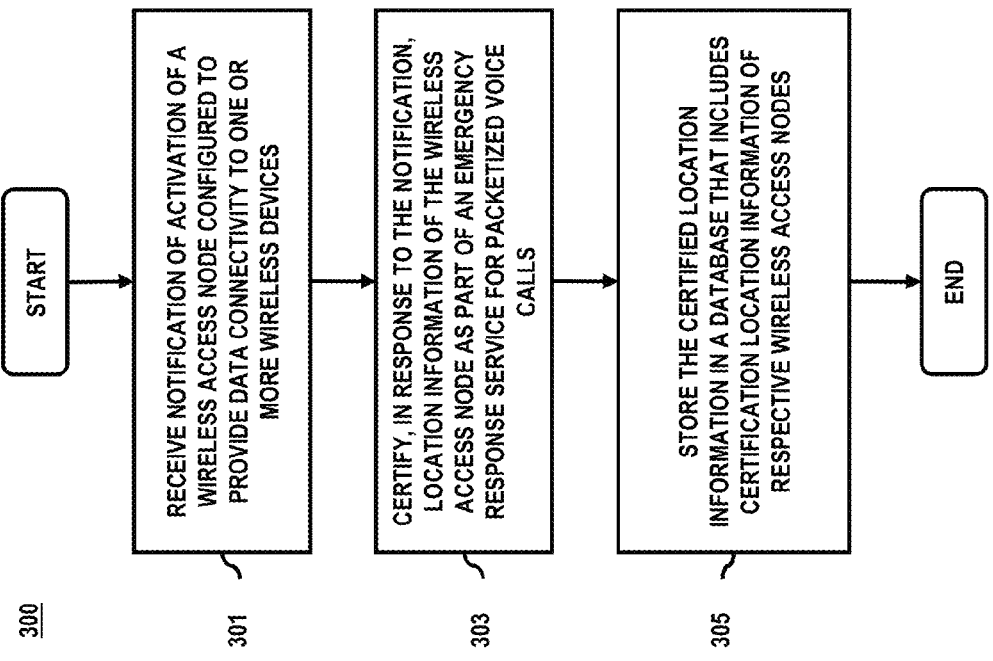
Figure 3C:
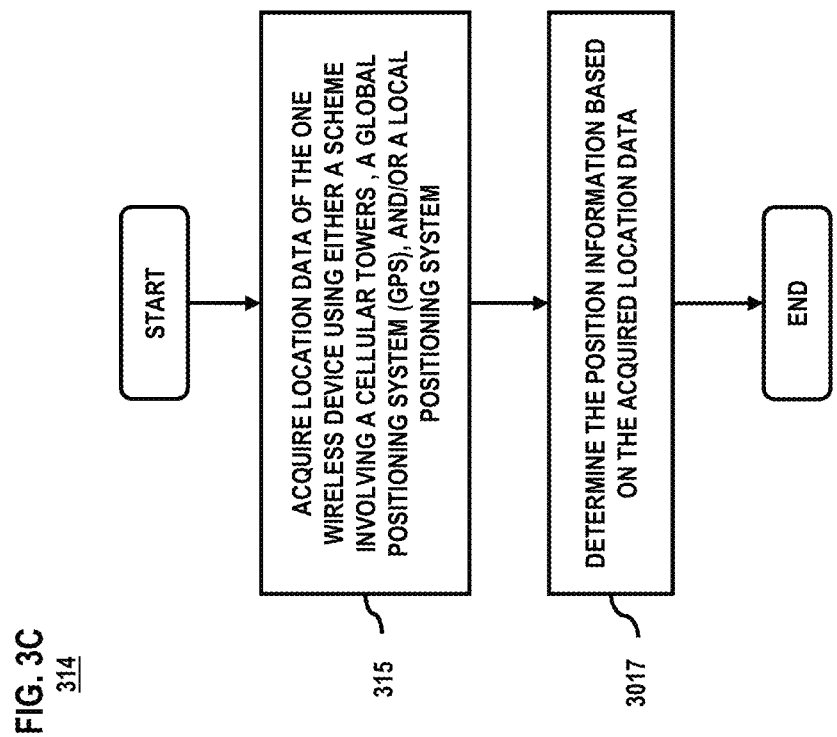
Figure 4:
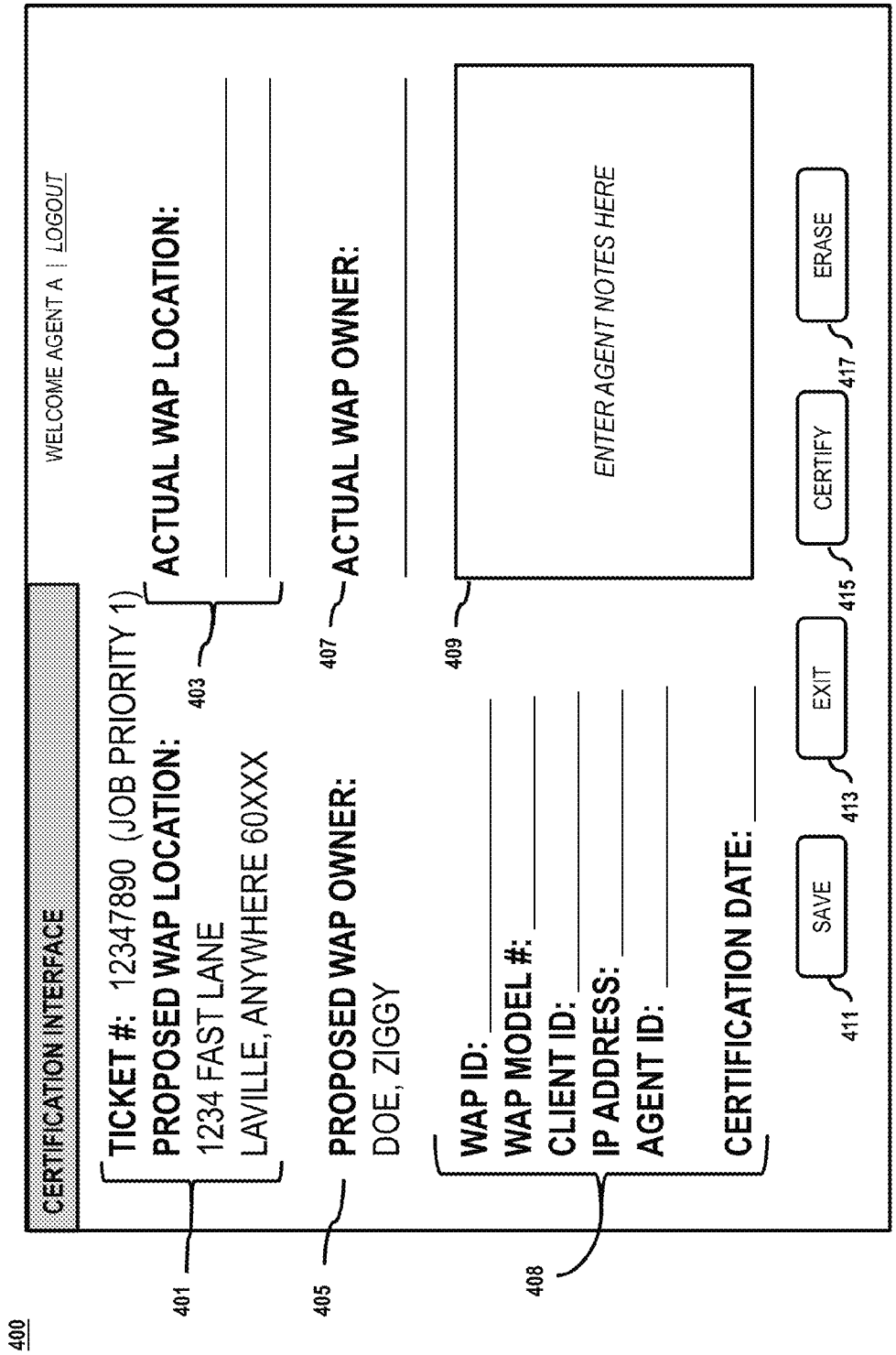
FIG. 4 is a diagram of a certification interface for facilitating certification of a wireless access node, according to an exemplary embodiment.

FIGS. 3A-3C are flowcharts of processes for certifying a wireless access node to enable the discovering of wireless devices in response to the placement emergency calls via the node, according to various embodiments. FIG. 4 is a diagram of a certification interface for facilitating certification of a wireless access node, according to an exemplary embodiment. For the purpose of illustration, processes 300, 306 and 314 of FIGS. 3A-3C are described with respect to the certification platform 109 operating in conjunction with the PSAP 107 (e.g., as separate entities). The certification interface of FIG. 4 is also described as it provides a means for facilitating the wireless access node certification processes. It is contemplated that in certain embodiments, the certification platform 109 can be integrated for operation within the PSAP 107 or its enabling communication applications. Likewise, the certification interface 400 may integrated for use in connection with a PSAP 107 emergency application.

In step 301 of process 300, the certification platform 109 receives notification of an activation of a wireless access node configured to provide data connectivity to one or more wireless devices. The notification may be initiated by way of a registration process or request process carried out by an owner of the wireless access node or alternatively, based on a notification signal transmitted by the wireless access node to the service provider or certification platform upon initial installment. In another step 303, the certification platform certifies location information of the wireless access node as part of an emergency response service for packetized voice calls. This step is carried out in response to the notification step 301. As mentioned previously, the certification is based on the verification and/or authentication of location information pertaining to the activated wireless access node. The certification process may include a combination of steps to be carried out by the agent, such as inspecting of the wireless access node and validating of the address of the premise at which it is installed. A certification status is then assigned to the wireless access node by the certification platform in response to the input of information regarding the wireless access node by the agent.

Per step 305, the certification platform stores the certified location information in a database that includes a plurality of certification location information of a respective plurality of wireless access nodes. The plurality of wireless access nodes includes the activated wireless access node. By way of example, the location information may be entered, certified and subsequently stored to the certified location database 119 through use of the certification interface 400 (or application) of FIG. 4. Upon physically or virtually inspecting and validating certain details regarding the wireless access node and its whereabouts, an agent acting on behalf of a service provider accesses the certification interface 400. A portion of the interface 400 presents proposed wireless access point (WAP) information 401, such as that provided by the owner of the activated wireless access node. As part of the certification process, the agent is required to enter actual (observed) WAP location information into various data entry fields 403 of the interface. The data may be entered in response to a ticket number issued along with a job priority value for facilitating the certification process. This corresponds to step 307 of process 306 (FIG. 3B), wherein the certification platform 109 generates a ticket to dispatch an agent of the service provider to inspect the activated wireless access node with respect to available location information.

Another portion 405 of the interface 400 presents proposed WAP owner information. To facilitate the certification, the agent is required to enter actual WAP owner information (e.g., first and last name) into a corresponding portion 407 of the interface. In another portion 408, the agent is presented with data entry fields for entry of a WAP identifier and model number, client identifier, internet protocol (IP) address of the device, agent identifier and a date of certification. The agent may also enter any additional notes in a notes section 409, and may capture data for sufficiently verifying the wireless coverage area of the activated wireless access node with respect to the location information (e.g., a coverage zone of the service provider) or data based on determined signal strength of the node within the wireless coverage area. The aforementioned process correspond to steps 309 and 311 of process 306 respectively.

Upon entering the above described data, the agent may select a "SAVE" action button 411 for saving the entered data (without certification), an "EXIT" action button 413 for exiting the interface/application 400, a "CERTIFY" action button 415 for indicating the entered information is to be certified by the platform 109 and a "ERASE" action button 417 for erasing any data populated at the various data entry fields. Selection of the "CERTIFY" action button, by way of example, facilitates step 305 of FIG. 3A, wherein the certified location information is stored in a database 119. It is noted that the date of certification may be entered by the agent or automatically assigned by the certification platform 109 upon selection of the "CERTIFY" action button 415, such as to facilitate step 313 of FIG. 3B wherein the inspection is verified completed. Also, the "CERTIFY" action button may be masked pending entry of required data, such as the actual owner or WAP location information 407 and 403 respectively, thus ensuring proper execution of the inspection for certification purposes.

It is noted that the above described data entry processes may also be facilitated by way of automated means, such as through the use of scanning devices by the agent at the location of the wireless access node. Under this approach, the agent may scan a barcode or other identifier affixed to the node for enabling automated reconciling of the above described data with available client and/or wireless access device records. Also, per steps 315 and 317 of process 314 (FIG. 3C), it is noted that certification platform 109 may acquire location by way of various mathematical schemes (e.g., cell tower triangulation), GPS techniques, LPS techniques or combinations thereof for determining position information of a wireless device that places an internet-based emergency call.

Figure 5:
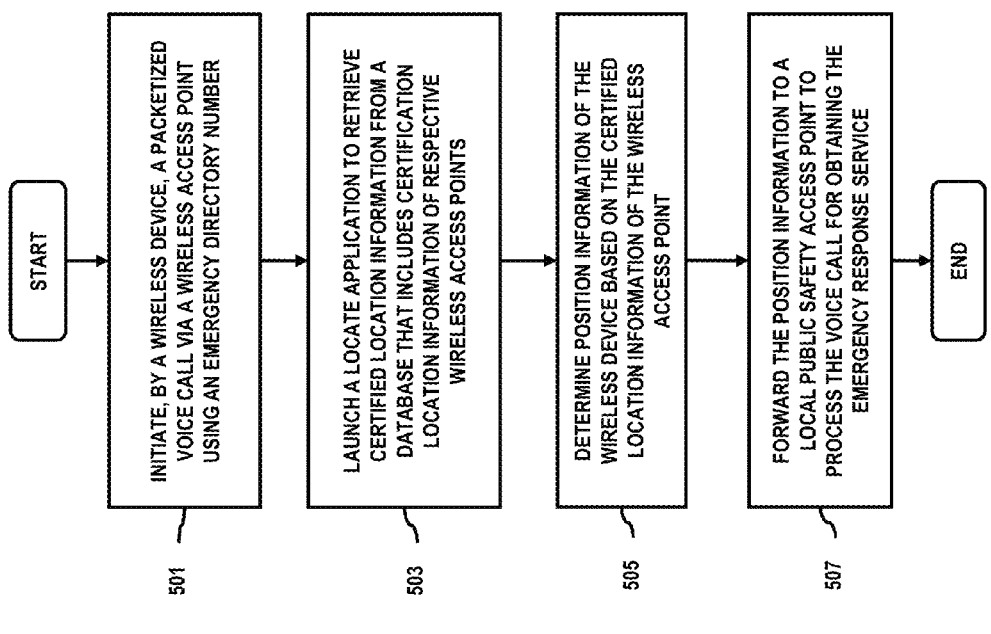
FIG. 5 is a flowchart of a process for directing an emergency call to a public safety access point based on location information pertaining to a certified wireless access node, according to one embodiment.

FIG. 5 is a flowchart of a process for directing an emergency call to a public safety access point based on location information pertaining to a certified wireless access node, according to one embodiment. For the purpose of illustration, process 500 of FIG. 5 is described with respect to a wireless device (e.g., mobile device 101a, 101b) as it interacts with the certification platform 109 and in conjunction with the PSAP 107 (e.g., as separate entities).

In step 501, the wireless device 101a initiates a packetized voice call via a wireless access point using an emergency directory number (e.g., 9-1-1). The call is initiated using a VoIP application, broadband phone application or other internet telephony application available for use by the wireless device. In another step 503, a locate application is launched in order to retrieve certified location information 119 from the certification platform 109. The certified location information includes information on the of the wireless access points, which include the wireless access point to which the user device is attempting to or in the process of placing the emergency call. It is noted that the locate application is automatically launched in response to the initiation step of 501.

Per step 505, the certification platform 103 determines position information of the wireless device 101a based on the certified location information of the wireless access point. As discussed, the determination process may include performance of various triangulation techniques, GPS techniques, LPS techniques (e.g., Wi-Fi positioning systems), etc. The location information as certified, therefore, provides a viable point of reference for determining the position of the wireless device in question. In another step 507, the position information is forwarded to the PSAP in order to process (e.g., fulfill) the voice call for obtaining the emergency response service.

By way of this approach, the PSAP receives location information that corresponds to the call, as described further later on with respect to FIG. 7.

FIGS. 6A-6D are diagrams of user interfaces for facilitating the placement of an emergency call based on certified location information, according to various embodiments. By way of example, the user interfaces correspond to that of a wireless device/mobile device 600 that is capable of accessing an internet-based calling application to place emergency calls. For illustrative purposes, the figures are described in connection with a use case of a device user desiring to place an emergency call (e.g., using VoIP) regarding a car accident. Under this scenario, mobile device 600 is configured to provide a GUI 601 to users via display 603.

GUI 601 presents a home page view 601a of the wireless device interface, which includes date and time information 615, to do and event information 617 and action buttons 619 and 621 for accessing various menu options and contacts respectively. As the user is traveling along a main road (Fast Lane) in their city (LaVille) in the state of Anywhere, they notice an accident involving a vehicle other than their own. As the driver appears to be incapacitated, they decide to place an emergency call. At a notification portion 613 of the interface 601, the device user notices there are 3 connections (e.g., wireless access points/nodes) available to the device 600 for placing the call. The notification portion 613 of the interface may be facilitated by a location application of the device 600, which is configured to interact with the certification platform to retrieve location information regarding the wireless device 600. In certain instances, the location application can be manually launched, launched in response to placement of an emergency call or active throughout the operation of the device (e.g., automatically turned on) for interacting with the various sensors of the device. For the example use case described herein, the latter scenario is assumed.

The user taps, touches or selects the notification portion 613 of the interface 601, which transitions the interface to present an available connections view 623 to the display 603. The available connections view 623 shows all of the connections that are available for selection by the user for accessing a network (e.g., the Internet). In this example, the 3 connections 625-629 are presented along with select location information as retrieved from the certification platform 109. Accompanying data, such as signal strength indicators and reliability rating values 635-639 are also presented. By way of example, a first wireless access node labeled "NET_GEAR 013" is shown to be secure, meaning it requires a key or password in order to connect to. Also presented is a certification status of "CERTIFIED," which indicates that this particular node has been processed and certified by the certification platform 109 already, unlike the node labeled "JILLS NETWORK", which is "UNCERTIFIED." Node 625 is also shown to indicate its signal level and a corresponding (optional) reliability rating of 2. Conversely, node 627 has no reliability rating as it is not certified. Under this scenario, the user selects node 629 labeled as "LIBRARY_21," which is the wireless access node (e.g., Wi-Fi router) for the local library. It is shown to be unsecured (public) and "CERTIFIED," and also has the highest reliability rating (R1) and signal strength. Selection includes tapping or touching the node 629 or activating it by way of a "CONNECT" action button 631.

It is noted that the reliability rating, being a function of the active location of the device, relative signal strengths, coverage areas and other factors with respect to a wireless access node at a given time may change dynamically. For example, if the user were to continue to move and to a point outside of a determined coverage area or where a signal is weaker, the reliability rating may change accordingly. It is also noted, for the above referenced use case, that the scene of the accident is within range of a public library for residing in the city of LaVille.

Upon selecting the node 629, the user accesses a network and launches an internet-based phone calling application. The IP based phone application interface 633 is shown to the display 603, which includes various alphanumeric data entry buttons 637 for dialing 911 or a data entry field for enabling entry by way of keypad, stylus or any other data entry means. Upon selection of the "DIAL" action button 639, the emergency call is initiated and the display transitions to an active call viewer 641, which presents the status of a current call being placed by the internet-based phone application. In this example, a message 643 is shown to indicate the phone is in emergency mode—i.e., anchored along with status detail data 647 such as call connection status and time elapse information. In this case, the user is connected to a 911 emergency operator/dispatcher and represented by a basic avatar or icon 645. It is noted that launching of the phone in emergency mode is performed in response to execution of the certification platform 109 being configured to locate the device 600. While various action buttons are made available, some include an "EXIT" action button 653 for exiting emergency mode and thus, disengaging the location determination process with the certification platform 109. "PROFILE" and "VIDEO" action buttons 649 and 651 respectively are also available for selection for enabling the user to submit personal profile information or video data to the emergency service operator/dispatcher to whom they are connected.

It is noted that facilitation of the emergency call to the certification platform 109 enables the IP based call to be directed to the correct PSAP 107. Furthermore, as shown with respect to FIG. 7, the dispatcher is able to receive pertinent position information for the device based, among other things, on certified location information regarding the various wireless access nodes 625-629. Still further, because of the features of the IP-based phone application, the user is able to associate and directly transmit live video, picture, contextual and profile information to the operator/dispatcher during the emergency call.

In this example, mobile phone 600 includes one or more transducers (e.g., speakers) 605 to output audible signals to the user. Cursor buttons 607, keypad 609, and microphone 611 enable users to interact with GUI 601 of display 603. As such, mobile device 600 is, in exemplary embodiments, also capable of speech synthesis and voice recognition. Moreover, the display 603 can be a touch-screen, such that controllers and buttons can be readily activated; for example, the reestablish call box 601e can be a button that activates the reestablishment of the call upon selection.

FIG. 7 is a diagram of a dispatcher interface for presenting information for discovering the location of a wireless device based on the placement of internet-based emergency call, according to one embodiment. The diagram is described with respect to the same use case scenario of FIGS. 6A-6D. The dispatcher, upon receiving the emergency call from the wireless device 600, accesses a dispatch viewer of the PSAP 107. The dispatch viewer 700 presents various details 701 regarding the user, including name and phone number information, as well as a user profile portion 703 of the dispatch viewer presents profile data regarding the caller. Also, certified location information as retrieved by the certification platform 109 is presented, including the physical/postal address of the wireless access node (node 629 of the Library), a node identifier value, IP address and tower identifier. Also presented is position information 705 corresponding to the determination by the certification platform 109; accordingly, the dispatcher may direct to a police officer by selecting a "DISPATCH" action button 707. The dispatcher can also record the phone call using the "RECORD" action button 709. GUI 700 may also include a "EXIT" button 711 to exit the view.

Other, more advanced features of the dispatch viewer are also available by virtue of the certification platform 103 and the ability of the user to place the emergency call via the internet. By way of example, the dispatcher may select a "SEND INSTRUCTIONS" action button 713 to automatically send data to the user regarding the accident such as medical care instructions, cautionary information, etc. As another feature, the dispatcher may view live or captured video or images via a video/image viewing portion 715 of the dispatch viewer. This information may also be saved or forwarded to the responding emergency service attendant (e.g., police officer) to facilitate real-time, accurate and timely details regarding an emergency. The above arrangement and associated processes, in certain embodiments, advantageously extend emergency services to packetized voice calls by leveraging existing infrastructure. In part, the capability to certify the wireless access nodes ensures the viability of using the location information of these nodes or access points to support such critical functions as emergency services.

The processes described herein for discovering the location of wireless devices in response to the placement of internet-based emergency calls may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
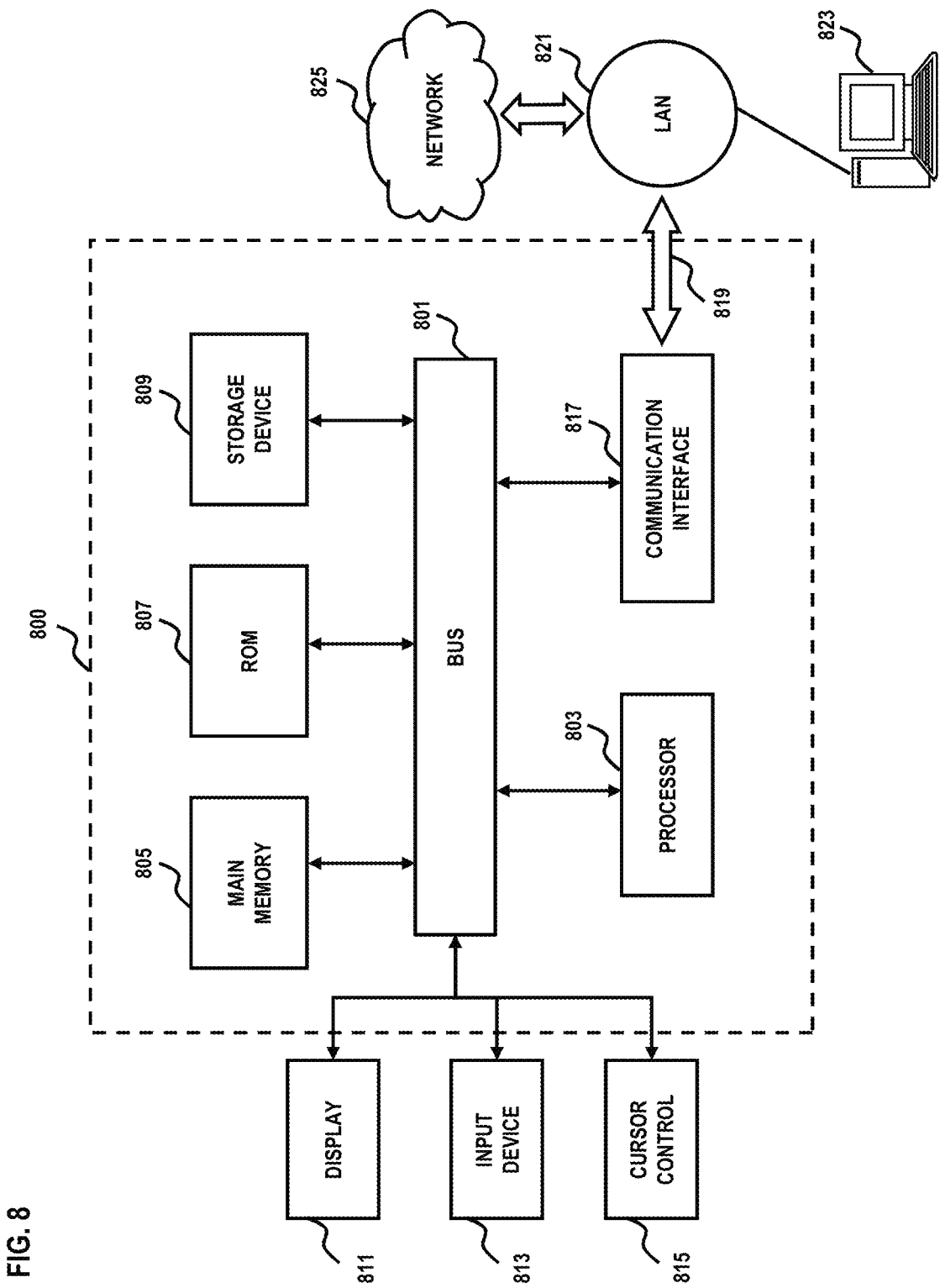
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805.

Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set or chip 900 upon which an embodiment of the invention may be implemented. Chip set 900 is programmed to enable advertisers to correlate a communication session with the amount of consumption of the advertisement by a viewer as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of placing and processing emergency packetized voice calls.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable advertisers to correlate a communication session with the amount of consumption of the advertisement by a viewer. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, by a service provider, notification of an activation of a wireless access node configured to provide data connectivity to one or more wireless devices;
   certifying by the service provider, in response to the notification, location information of the wireless access node as part of an emergency response service for packetized voice calls; and
   storing the certified location information in a database that includes a plurality of certified location information of a respective plurality of certified wireless access nodes including the activated wireless access node, and a plurality of uncertified wireless access nodes for which location information is uncertified,
   wherein the database is accessed for one of the wireless devices in response to an emergency call to assist with determination of position information of the one of the wireless devices based on a corresponding one of the location information of the wireless access node that detects presence of the one wireless device,
   wherein certified location information is location information that the service provider has certified as being an actual location of the certified wireless access node,
   wherein the location information of each wireless access node that detects the presence of the one wireless device is accompanied by reliability rating information and a signal strength indicator for presentation on a display of one wireless device, and
   wherein the reliability rating is a metric for indicating the extent of reliability of a certified wireless access node for conveying position information regarding the one wireless device to a public safety access point (PSAP).

2. A method according to claim 1, wherein the location information of the activated wireless access node includes a postal address for a premise housing the activated wireless access node, the method further comprising:
   determining that the emergency call originates from the postal address.

3. A method according to claim 1, wherein the database is maintained by a service provider, and the certification comprises:
   generating a ticket to dispatch an agent of the service provider to inspect the activated wireless access node with respect to the location information of the activated wireless access node; and
   verifying completion of the inspection.

4. A method according to claim 3, wherein the certification further comprises:
   verifying a wireless coverage area of the activated wireless access node with respect to the location information of the activated wireless access node.

5. A method according to claim 3, wherein the certification further comprises:
   determining signal strength of the activated wireless access node within the wireless coverage area.

6. A method according to claim 1, further comprising:
   acquiring location data of the one wireless device using either a mathematical scheme involving a plurality of cellular towers, a global positioning system (GPS), a local positioning system (LPS), or a combination thereof,
   wherein the position information is determined based further on the acquired location data.

7. A method according to claim 1, wherein the activated wireless access node includes a router configured to route packets associated with the emergency call.

8. An apparatus comprising:
   at least one processor; and
   at least one memory including computer program code for one or more programs,
   the at least one memory and the computer program code configured to, with the at least one processor, cause the apparatus to perform at least the following,
   receive, by a service provider, notification of an activation of a wireless access node configured to provide data connectivity to one or more wireless devices,
   certify by the service provider, in response to the notification, location information of the wireless access node as part of an emergency response service for packetized voice calls, and
   store the certified location information in a database that includes a plurality of certified location information of a respective plurality of certified wireless access nodes including the activated wireless access node, and a plurality of uncertified wireless access nodes for which location information is uncertified,
   wherein the database is accessed for one of the wireless devices in response to an emergency call to assist with determination of position information of one of the wireless devices based on a corresponding one of the location information of the wireless access node that detects presence of the one wireless device,
   wherein certified location information is location information that the service provider has certified as being an actual location of the certified wireless access node, wherein the location information of each wireless access node that detects the presence of the one wireless device is accompanied by reliability rating information and a signal strength indicator for presentation on a display of one wireless device, and wherein the reliability rating is a metric for indicating the extent of reliability of a certified wireless access node for conveying position information regarding the one wireless device to a public safety access point (PSAP).

9. An apparatus according to claim 8, wherein the location information of the activated wireless access node includes a postal address for a premise housing the activated wireless access node, the apparatus being further caused to:

determine that the emergency call originates from the postal address.

10. An apparatus according to claim 8, wherein the database is maintained by a service provider, and the certification comprises generating a ticket to dispatch an agent of the service provider to inspect the activated wireless access node with respect to the location information of the activated wireless access node.

11. An apparatus according to claim 10, wherein the certification further comprises verifying wireless coverage area of the activated wireless access node with respect to the location information of the activated wireless access node.

12. An apparatus according to claim 10, wherein the certification further comprises determining signal strength of the activated wireless access node within the wireless coverage area.

13. An apparatus according to claim 8, wherein the apparatus is further caused to:

acquire location data of the one wireless device using either a mathematical scheme involving a plurality of cellular towers, a global positioning system (GPS), a local positioning system (LPS), or a combination thereof, wherein the position information is determined based further on the acquired location data.

14. An apparatus according to claim 8, wherein the activated wireless access node includes a router configured to route packets associated with the emergency call.

* * * * *